Aug. 8, 1967       A. N. LURJE ETAL       3,335,303
HORIZONTAL CAPSULE GENERATOR
Filed March 10, 1964                     2 Sheets-Sheet 1

United States Patent Office 3,335,303
Patented Aug. 8, 1967

3,335,303
HORIZONTAL CAPSULE GENERATOR
Alexandr Nesanelevich Lurje, Grigory Borisovich Pinsky, Nikolai Pavlovich Ivanov, Konstantin Vasiljevich Beljanin, Aron Beniaminovich Shapiro, Pavel Mikhailovich Ipatov, and Alexandr Sergeevich Eremeev, Leningrad, U.S.S.R., assignors to Vsesouzny Nauchno-Issledovatelsky Institute Elektromekhaniki, Leningrad, U.S.S.R.
Filed Mar. 10, 1964, Ser. No. 350,839
5 Claims. (Cl. 310—54)

The present invention relates to electric generators and in particular, to capsule hydrogenerators.

At present, cooling of capsule hydrogenerators is carried out by means of compressed air.

It proves to be extremely difficult to increase the power of such generators since hydraulic conditions do not permit the outer diameter of the capsule generator to be of a larger size. Moreover, the air does not provide intensive cooling of the stator and rotor windings.

A cooling system with compressed air complicates the design of the capsule hydrogenerator while adversely affecting its performance.

It is known to use water as a coolant for armature bars of conventional electric generators.

In accordance with a preferred embodiment the invention contemplates liquid cooling for capsule hydrogenerators.

An object of the present invention is to provide a capsule hydrogenerator with liquid cooling of the rotor, stator and damper windings as well as the stator core.

Figure 1:
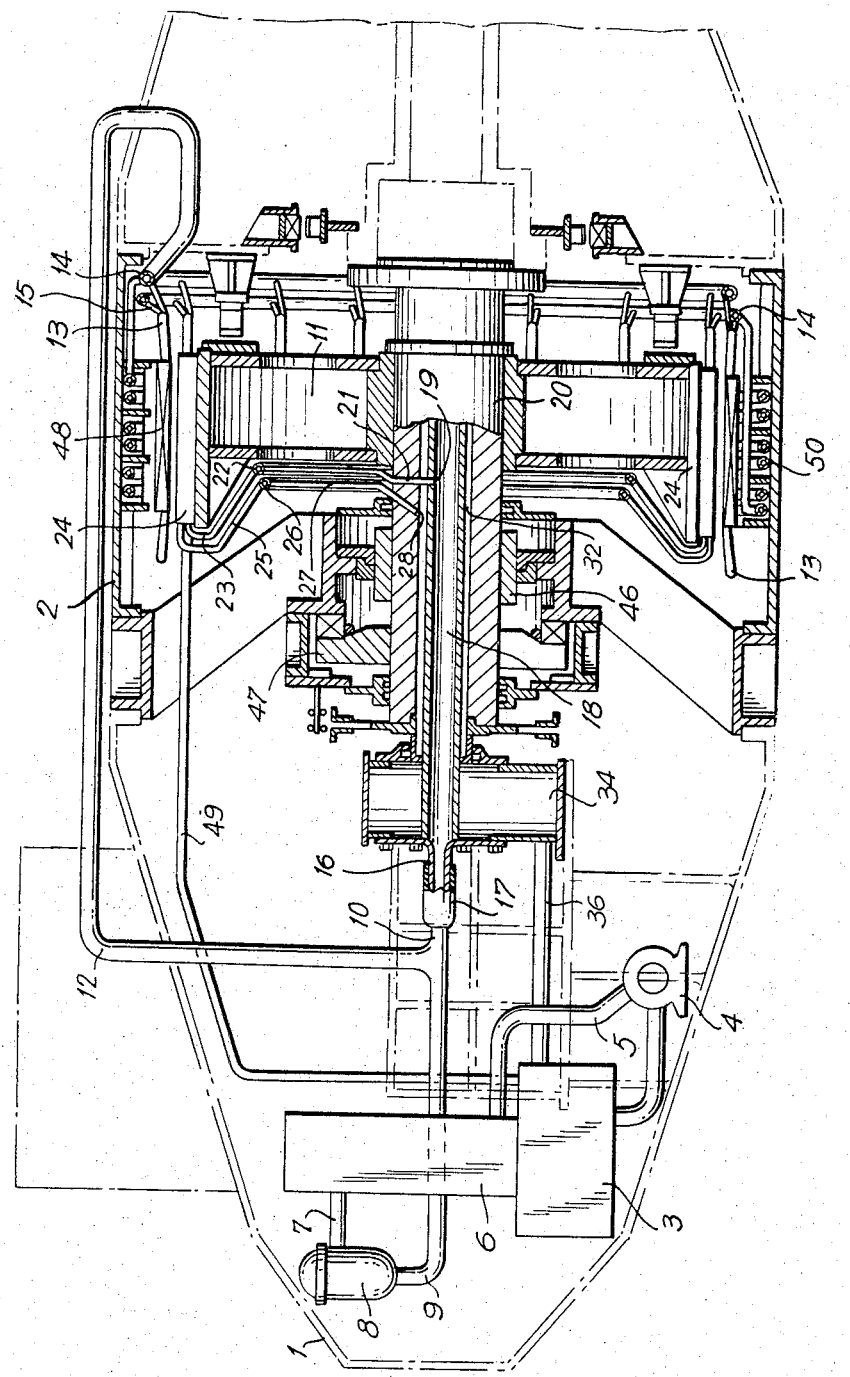
Figure 2:
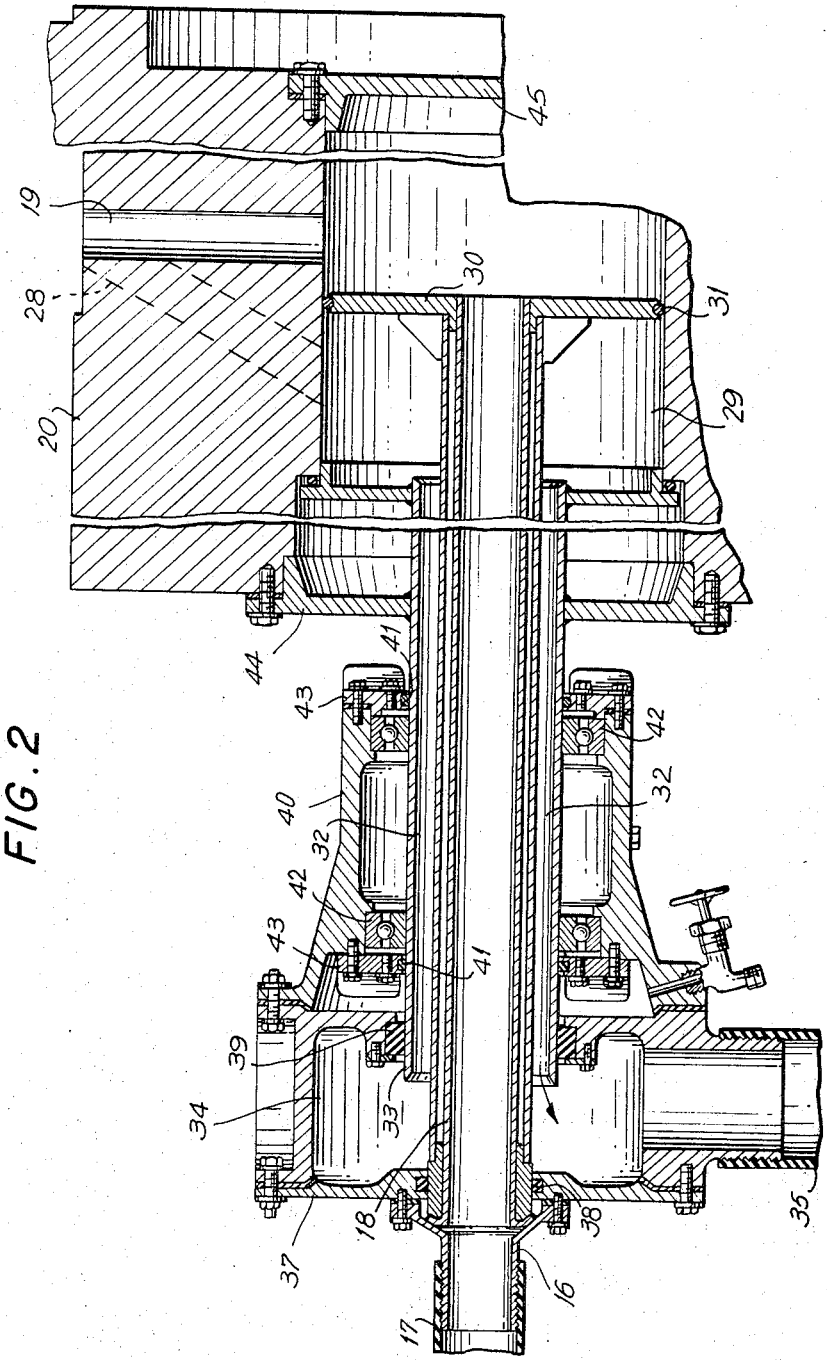

In accordance with the aforementioned and other objects the present invention comprises a novel combination of units and parts herein described and claimed in the appended claims. Various modifications in the embodiment of the invention herein disclosed may be made within the scope set forth in the appended claims without departing from the spirit of the invention. Other objects and advantages of the invention will become apparent from the following description which is given in conjunction with the accompanying drawings, in which:

FIG. 1 is a sectional view of a horizontal capsule hydrogenerator with a liquid cooling system, and
FIG. 2 is a sectional view of the unit delivering the coolant to the generator rotor.

The hydrogenerator is actuated by water which washes the head portion of capsule 1 and the hermetically sealed casing 2 of the stator, after which the water is fed to the impeller blades of the turbine.

In the generator, distilled water serves as a coolant. The water is contained in tank 3 from which it is pumped by means of pump 4 through pipe 5 into heat exchanger 6 where the water is cooled.

From heat exchanger 6 the water passes through pipe 7 into filter 8 then to through pipe 9 it enters feeding pipe 10 of rotor 11 and pipe 12 of the stator.

All the aforementioned parts of the cooling system form a closed circulation system and are accommodated inside the head of the capsule 1 and do not require special space.

Bars of the stator winding 13 are conductors of two types, hollow and solid ones. The distilled water from pipe 12 is delivered to the bars and is drained through circular main pipes 14, located in the zone of the coil ends of winding 13 by means of rubber conduits 15. From one of the circular pipes 14 the water returns to tank 3 via pipe 49.

Water supply into rotor 11 is provided through pipe union 16 fitted on which is flexible conduit 17. The distilled water flows into pipe 18 and then through radial openings 19 (only one of which is shown) in the shaft body 20, into pipe 21, to the circular feeding pipe 22 arranged on rotor rim 11. From circular pipe 22 water is delivered through rubber conduits 23 to the hollow winding 24 of the poles of the rotor 11.

Water from windings 24 is drained through flexible conduits 25 into circular manifold 26 wherefrom hot water flows through pipes 27 (only one of which is shown) and inclined opening 28, entering into chamber 29 separated from cold water by means of partition 30 with seal 31. Thereafter the drained water passes along the circular passage 32 formed by pipes 18 and 33 and enters drain chamber 34 and further through flexible conduit 35 and pipe 36 enters tank 3 of the cooling system.

Pipe 18 is of the twin type to provide thermal insulation between the cold and hot water flows.

The fixed part of the unit which serves for water supply to rotor 11 has cover 37 with seal 38, drain chamber 34 with seal 39 and bearing bush 40 with seals 41. By means of antifriction bearings 42 and rings 43 the whole fixed part of the water supply unit is fitted onto revolving pipe 33.

The revolving part of the unit is fastened to shaft 20 of the rotor 11 by means of thrust plate 44. On the opposite side the central opening of shaft 20 is closed with cover 45.

The described method of cooling rotor 11 makes it possible to considerably simplify oil delivery to bearing 46 and footstep 47 since for cooling rotor 11 with compressed air a special arrangement is required to control oil pressure depending upon air pressure inside capsule 1 in order to prevent air escape through the seals.

If capsule hydrogenerators are intended to operate for long periods at considerable current assymetry in phases or to act as motors (for units installed on tidal and pumped-storage hydro-electric stations), the damper winding should also have a water cooling system. For this particular case the bars of the damper windings are made hollow and connected to circular feedpipes 22 by means of rubber conduits.

Stator core 48 is cooled by means of special pipes 50 placed in the back zone of stator steel and interconnected by means of conduits in the zone of the coil ends of windings 13. Core 48 will require cooling if the generator voltage exceeds 4 kv.

What is claimed is:

1. A horizontal capsule hydrogenerator comprising a stator including hollow windings having a back zone, a system of pipes arranged in said back zone for cooling the core of the stator by means of a liquid coolant; a rotor including hollow windings, said rotor being disposed inside said stator; a damper system with hollow bars arranged on the rotor; means for delivering the coolant to said rotor, said means including a fixed part of floating type, a revolving part, anti-friction bearing means coupling said parts and flexible conduit means enabling delivery and draining of the coolant; a system for heat exchange of the cooling liquid; and means for connecting the heat exchange system for the cooling liquid to said hollow windings of the stator, the rotor and the damper system to provide a closed circuit for the cooling liquid to pass.

2. A horizontal capsule hydrogenerator comprising a stator including hollow windings having a back zone, and a system of pipes in said back zone for cooling the core of the stator with a cooling liquid; a rotor including hollow windings disposed inside said stator; a damper system including hollow bars arranged on the rotor; means for delivery of the cooling liquid to said rotor, said means including a fixed part of floating type, a revolving part, anti-friction bearing means coupling said parts, and flexible conduit means enabling delivery and draining of the cooling liquid; a system for heat exchange of the cooling liquid including a tank, a heat exchanger, a pump and a filter located in the hydrogenerator capsule; and means for connecting the heat exchanger system to said hollow windings of the stator, the rotor and the damper system to provide a closed circuit for the cooling liquid to pass.

3. A horizontal capsule hydrogenerator comprising a stator including hollow windings having a back zone and a system of pipes in said back zone for cooling the core of the stator with a cooling liquid; a rotor including hollow windings and disposed inside said stator; a damper system including hollow bars arranged on the rotor; means for delivering the cooling liquid to said rotor, said means including a fixed part of floating type, a revolving part, anti-friction bearing means coupling said parts and flexible conduit means enabling delivery and drainage of the cooling liquid; a system for heat exchange of the cooling liquid comprising a tank, a heat exchanger, a pump and a filter, all of which are located in the hydrogenerator capsule; flexible conduits and feed pipes for connecting the heat exchange system for the cooling liquid with said hollow windings of the stator, the rotor and the damper system to provide a closed circuit for the cooling liquid to pass.

4. A hydrogenerator as claimed in claim 3 wherein said revolving part of the means for delivering cooling liquid to the rotor comprises a rotatable tube in communication with the rotor, said feed pipes connecting the heat exchange system and the rotor comprising a second tube surrounding the first said tube to define an annular passage therewith, said annular passage being in communication with the heat exchange system and the rotor but in isolation with the interior of the first said tube for return of liquid to the heat exchange system from the rotor.

5. A hydrogenerator as claimed in claim 4 wherein said feed pipes comprise a pipe arrangement adjacent said rotor and in communication with the hollow windings of the rotor and said first tube for conveying cooling liquid from the latter to the hollow windings of the rotor, and a second pipe arrangement for conveying liquid from the hollow windings of the rotor to said annular passage.

References Cited

UNITED STATES PATENTS

| | | | |
|---|---|---|---|
| 1,238,304 | 8/1917 | Kuyser | 310—183 |
| 1,262,774 | 4/1918 | Gilman | 310—183 |
| 1,607,288 | 11/1926 | Laffoon | 310—54 |
| 1,761,387 | 6/1930 | Gay | 310—54 |
| 2,700,115 | 1/1955 | Mowery | 310—57 |
| 2,862,119 | 11/1958 | Else et al. | 310—54 |
| 2,898,484 | 8/1959 | Krastchew | 310—54 |
| 3,056,055 | 9/1962 | Willyoung et al. | 310—54 |
| 3,097,317 | 7/1963 | Fechheimer | 310—54 |

MILTON O. HIRSHFIELD, *Primary Examiner.*

L. L. SMITH, *Assistant Examiner.*